US012694790B2

(12) United States Patent　　　　　(10) Patent No.:　US 12,694,790 B2
　　Nose　　　　　　　　　　　　　　　(45) Date of Patent:　　　Jul. 28, 2026

(54) TURN CONTROL DEVICE FOR MOTORCYCLE

(71) Applicant: HONDA MOTOR CO., LTD., Tokyo (JP)

(72) Inventor: Tsubasa Nose, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 195 days.

(21) Appl. No.: 18/696,357

(22) PCT Filed: Sep. 28, 2021

(86) PCT No.: PCT/JP2021/035713
　　　§ 371 (c)(1),
　　　(2) Date: Oct. 23, 2024

(87) PCT Pub. No.: WO2023/053225
　　　PCT Pub. Date: Apr. 6, 2023

(65) Prior Publication Data
　　　US 2025/0336299 A1　　　Oct. 30, 2025

(51) Int. Cl.
　　　*G08G 1/16*　　　　(2006.01)
　　　*B62J 50/22*　　　(2020.01)
　　　*G06V 20/58*　　　(2022.01)
(52) U.S. Cl.
　　　CPC .............. *G08G 1/166* (2013.01); *G06V 20/58* (2022.01); *B62J 50/22* (2020.02); *G06V 2201/08* (2022.01)
(58) Field of Classification Search
　　　CPC .... G08G 1/166; G06V 20/58; G06V 2201/08; B62J 50/22; B62J 45/20; B62J 50/21;
　　　　　　　　　(Continued)

(56) References Cited

U.S. PATENT DOCUMENTS

2019/0300012 A1　10/2019　Tsukada et al.
2022/0222475 A1*　7/2022　Oesterling ............. G08G 1/166
　　　　　　　　　　　(Continued)

FOREIGN PATENT DOCUMENTS

JP　　2019172155 A　10/2019
JP　　2020059339 A　4/2020
　　　　　　　　(Continued)

*Primary Examiner* — Grant Moubry
*Assistant Examiner* — Ruben Picon-Feliciano
(74) *Attorney, Agent, or Firm* — CKC & Partners Co. LLC

(57)　　　　　　ABSTRACT

Provided is a steering control device for motorcycle, capable of executing steering control appropriate for a characteristic of a motorcycle. The steering control device for motorcycle comprises: an imaging unit (2) which captures the outside of an own vehicle (1); a blind spot recognition unit (8) which recognizes that another vehicle (50) is approaching from a blind spot (5) of the own vehicle (1) on the basis of information from the imaging unit (2); and a steering-device control unit (10) which carries out steering control on the basis of information from the blind spot recognition unit (8), wherein the steering-device control unit (10) carries out the steering control to avoid the other vehicle (50) according to a riding state of the own vehicle (1). The riding state of the own vehicle (1) includes a path change operation, an acceleration operation, and a deceleration operation of a rider and the steering-device control unit (10) changes an intervention amount of the steering control according to the path change operation, the acceleration operation, and the deceleration operation of the rider.

2 Claims, 4 Drawing Sheets

(58) Field of Classification Search
CPC ...... B62J 27/00; B62J 45/41; B60W 2300/36;
B60W 2710/20; B60W 30/095; B60T
8/1706; B62K 21/00
See application file for complete search history.

(56) References Cited

U.S. PATENT DOCUMENTS

| 2023/0015466 | A1 | 1/2023 | Jiralerspong et al. | |
|---|---|---|---|---|
| 2023/0249778 | A1* | 8/2023 | Yellore | G08G 1/166 |
| | | | | 701/96 |

FOREIGN PATENT DOCUMENTS

| JP | 2020158067 | A | 10/2020 |
|---|---|---|---|
| JP | 2021100827 | A | 7/2021 |

* cited by examiner

TURN CONTROL DEVICE FOR MOTORCYCLE

TECHNICAL FIELD

The present disclosure relates to a turn control device for a motorcycle, and more particularly, to a turn control device for a motorcycle that automatically performs turning control on a steering handlebar in accordance with a predetermined state.

BACKGROUND ART

A turn control device for a vehicle that automatically performs turning control on a steering handlebar in accordance with a predetermined state is known.

Patent Document 1 discloses a turn control device for a host vehicle in which a course of the host vehicle is changed by performing turning control on a steering handlebar when another vehicle approaches a blind spot of the host vehicle.

CITATION LIST

Patent Document

Patent Document 1: Japanese Unexamined Patent Application, Publication No. 2021-100827

DISCLOSURE OF THE INVENTION

Problems to be Solved by the Invention

However, the turn control device of Patent Document 1 applies to a four-wheeled vehicle, and for a motorcycle in which a vehicle body posture can more easily change due to turning control, it is necessary to implement unique turning control.

An object of the present disclosure is to provide a turn control device for a motorcycle capable of executing turning control suitable for characteristics of the motorcycle by solving the above-mentioned problems of the prior art.

Means for Solving the Problems

To achieve the above object, the present disclosure provides a first feature in which a turn control device for a motorcycle comprises: an imager (2) that takes an image facing an outer direction of a host vehicle (1); a blind spot recognizer (8) that recognizes that another vehicle (50) is approaching from a direction of a blind spot (5) of the host vehicle (1) based on information from the imager (2); and a turn device controller (10) that performs turning control based on information from the blind spot recognizer (8), in which, the turn device controller (10) performs turning control to avoid the other vehicle (50) in accordance with a riding state of the host vehicle (1).

The present disclosure also provides a second feature in which the riding state of the host vehicle (1) includes at least one of a course changing operation, an acceleration operation, or a deceleration operation performed by a rider, and the turn device controller (10) changes an intervention amount of turning control in accordance with the rider performing the at least one of the course changing operation, the acceleration operation, or the deceleration operation.

The present disclosure further provides a third feature in which the turn device controller (10) gradually increases the intervention amount of turning control in accordance with the rider performing the at least one of the course changing operation, the acceleration operation, or the deceleration operation.

Effects of the Invention

According to the first feature of the present disclosure, in a turn control device for a motorcycle comprising: an imager (2) that takes an image facing an outer direction of a host vehicle (1); a blind spot recognizer (8) that recognizes that another vehicle (50) is approaching from a direction of a blind spot (5) of the host vehicle (1) based on information from the imager (2); and a turn device controller (10) that performs turning control based on information from the blind spot recognizer (8), the turn device controller (10) performs turning control to avoid the other vehicle (50) in accordance with a riding state of the host vehicle (1). Therefore, it is possible to appropriately avoid the other vehicle that follows in a blind spot.

According to the second feature of the present disclosure, the riding state of the host vehicle (1) includes the at least one of a course changing operation, an acceleration operation, or a deceleration operation performed by a rider, and the turn device controller (10) changes an intervention amount of turning under control in accordance with the rider performing the at least one of the course changing operation, the acceleration operation, or the deceleration operation. Therefore, in a case in which the rider has not performed the course changing operation, the acceleration operation, or the deceleration operation even when the other vehicle has approached the host vehicle and thus it can be determined that the rider has failed to notice the approach of the other vehicle 50, it is possible to adjust changes in a vehicle body behavior by changing an intervention amount of turning control.

According to the third feature of present disclosure, the turn device controller (10) gradually increases the intervention amount of turning control in accordance with the rider performing the at least one of the course changing operation, the acceleration operation, or the deceleration operation. Therefore, in a case in which it can be determined that the rider has failed to notice the approach of the other vehicle, it is possible to prevent sudden changes in the vehicle body behavior and prevent giving the rider a sense of unease by gradually increasing the intervention amount of turning control.

PREFERRED MODE FOR CARRYING OUT THE INVENTION

Figure 1:
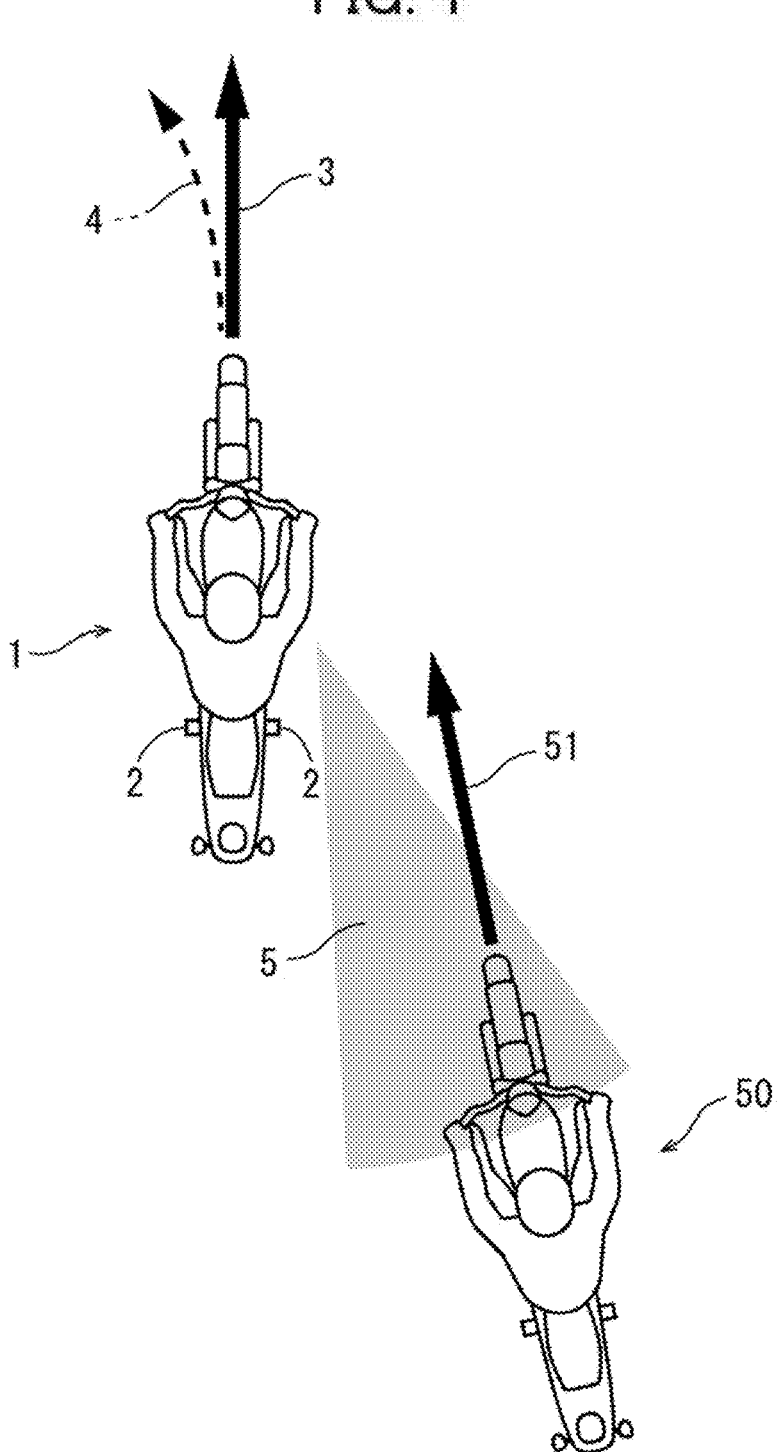
FIG. 1 is a plan view illustrating a positional relationship between a host vehicle and another vehicle while traveling.

The following describes in detail a preferred embodiment of the present disclosure with reference to the accompanying drawings. FIG. 1 is a plan view illustrating a positional relationship between a host vehicle 1 and another vehicle 50 while traveling. This figure illustrates a situation in which the other vehicle 50, as a motorcycle traveling along a course 51, approaches a host vehicle 1, as a motorcycle traveling along a course 3, from a rear-right direction.

The other vehicle 50 is approaching the host vehicle 1 that is in a situation in which the other vehicle 50 enters a blind spot 5 in the rear-right direction of the rider of the host vehicle 1, and if the other vehicle 50 and the host vehicle 1 maintain their respective courses, there is a possibility that the other vehicle 50 will come into contact with a right-side portion of the host vehicle 1.

The motorcycle 1 according to the preferred embodiment of the present disclosure includes a pair of left and right imagers 2, each including a camera capable of taking an image in a side direction. The imager 2 can take an image over a wide range including the blind spot 5. The motorcycle 1 is configured to detect that the other vehicle 50 has entered the blind spot 5 based on information from the imager 2 and performs turning control, by an actuator, on a steering handlebar of the motorcycle 1 such that the motorcycle 1 automatically changes to a course 4 in which contact with the other vehicle can be avoided. The other vehicle 50 is not limited to a motorcycle and may be a three-wheeled vehicle or a four-wheeled vehicle.

Figure 2:
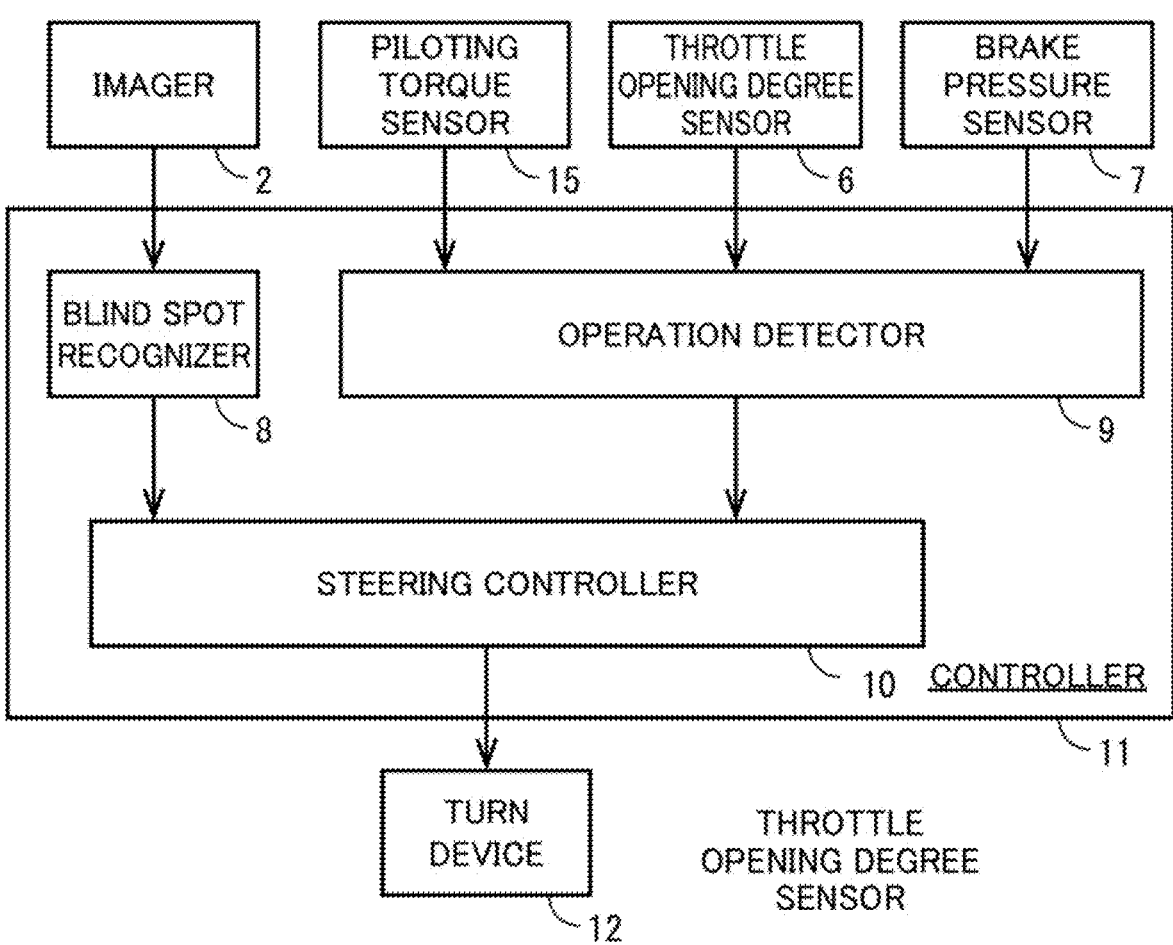
FIG. 2 is a block diagram illustrating a configuration of a turn control device of a motorcycle as a host vehicle.

FIG. 2 is a block diagram illustrating a configuration of a turn control device of the motorcycle 1 as the host vehicle. The motorcycle 1 includes a controller 11, the controller 11 includes a blind spot recognizer 8, an operation detector 9, and a turn device controller 10. The blind spot recognizer 8 recognizes that the other vehicle 50 is approaching from a direction of the blind spot 5 of the host vehicle 1 based on the information from the imager 2. The operation detector 9 detects, by a piloting torque sensor 15, a throttle opening degree sensor 6, and a brake pressure sensor 7, whether or not the rider is performing an operation to avoid the other vehicle 50. Further, based on the information from the blind spot recognizer 8 and the operation detector 9, the turn device controller 10 drives a turn device 12 connected to the steering handlebar and executes turning control for avoiding the other vehicle 50.

Here, in a case in which the rider has failed to notice the approach of the other vehicle 50 when the other vehicle 50 enters the blind spot 5, and turning control is immediately executed with maximum torque, it is possible that a change in the vehicle body behavior may give the rider a sense of unease because, from a point of view of the rider, the steering handlebar is suddenly turned.

In contrast, in a case in which the rider has noticed the approach of the other vehicle 50 such as by looking back in the rear-right direction or an alarm being issued from a vehicle, it is conceivable for the rider to perform, by the steering handlebar, a throttle, or a brake, an avoidance operation (a course-changing operation, an acceleration operation, or a deceleration operation). In other words, in a case in which at least one selected from the steering handlebar, the throttle, and the brake is operated when the other vehicle 50 enters the blind spot 5, it can be determined that the rider has noticed the approach of the other vehicle 50. In a case in which the rider has noticed the approach of the other vehicle 50, the rider is mentally and physically prepared, and the rider is less likely to feel unease even if turning control is immediately performed with maximum torque.

As such, the turn control device according to the present disclosure is configured, in a case in which the rider has failed to notice the approach of the other vehicle 50 when the other vehicle 50 enters the blind spot 5, to decrease an initial intervention amount of turning control and gradually increase a piloting torque, and in a case in which the rider has noticed the approach of the other vehicle 50 when the other vehicle 50 enters the blind spot 5 to immediately execute turning control with the maximum torque. Accordingly, in a case in which the rider has failed to notice the approach of the other vehicle 50, it is possible to execute turning control that does not give the rider a sense of unease until the rider notices the approach of the other vehicle 50, and in a case in which the rider notices the approach of the other vehicle 50, it is possible to immediately execute turning control with the maximum torque.

Figure 3:
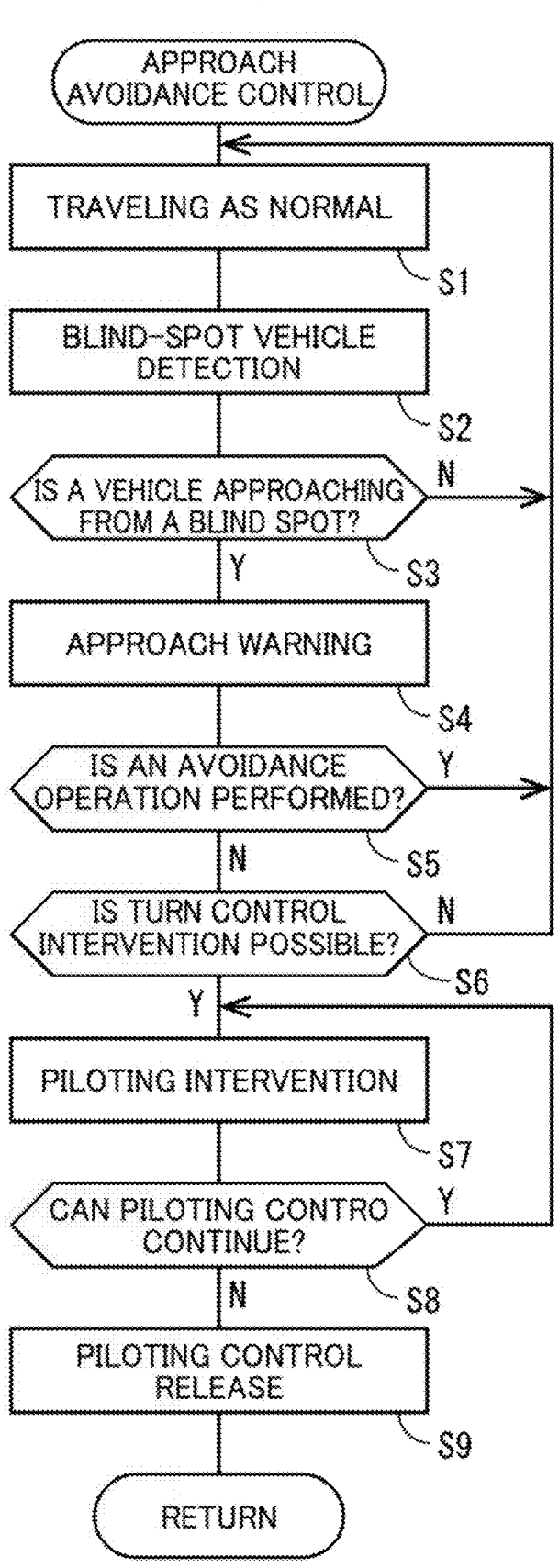
FIG. 3 is a flowchart illustrating a procedure of approach avoidance control according to a preferred embodiment of the present disclosure.

FIG. 3 is a flowchart illustrating a procedure of approach avoidance controls according to a preferred embodiment of the present disclosure. In step S1, the host vehicle 1 is traveling as normal. In step S2, the other vehicle 50 having entered the blind spot 5 is detected. In step S3, the blind spot recognizer 8 determines whether or not the other vehicle 50 that has entered the blind spot 5 is approaching, and when an affirmative determination is made, the procedure proceeds to step S4. In step S4, an approach alert is issued by a display on a meter, a buzzer sound, or the like. When a negative determination is made in step S3, the procedure returns to step S1.

In step S5, whether or not the rider has performed an avoidance operation is determined, and when an affirmative determination is made, the procedure returns to step S1. As described above, the presence or absence of the avoidance operation is determined based on output signals from the piloting torque sensor 15, the throttle opening degree sensor 6, and the brake pressure sensor 7. In contrast, when a negative determination is made in step S5, that is, in a case in which the rider has failed to perform the avoidance operation when the other vehicle 50 that has entered the blind spot 5 approaches the host vehicle 1, the procedure proceeds to step S6, and whether or not piloting (turn) control intervention is possible is determined. In a case in which an affirmative determination is made in step S5, turning control can be immediately executed with a maximum target torque.

When an affirmative determination is made in step S6, the process proceeds to step S7, and a piloting intervention is executed by the turn device controller 10. In the preferred embodiment of the present disclosure, in this piloting intervention, control that reduces the initial intervention amount of turning control and gradually increases the piloting torque is executed. In contrast, when a negative determination is made in step S6, that is, when it is determined that piloting control intervention is not possible, the process returns to step S1.

In step S8, whether or not the piloting control can be continued is determined, and when an affirmative determination is made, the procedure returns to step S7. In contrast, when a negative determination is made in step S8, that is, when it is determined that the piloting control cannot be continued due to a change to the target course for avoiding the other vehicle 50 being completed or the like, the process proceeds to step S9 to release the piloting control and end the procedure of approach avoidance controls.

Figure 4:
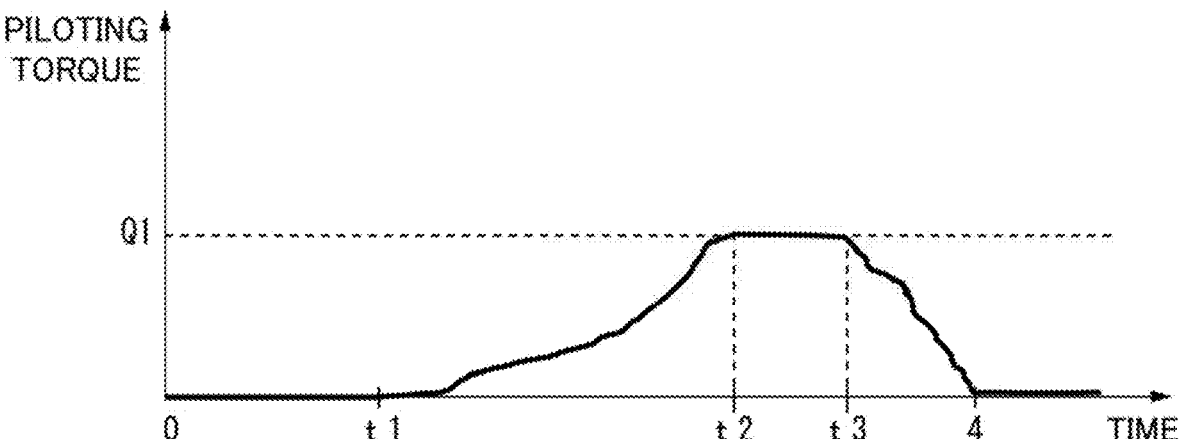
FIG. 4 is a graph illustrating a mode of turning control in a case in which a rider fails to notice that another vehicle has entered a blind spot.

FIG. 4 is a graph illustrating a mode of turning control in a case in which the rider fails to notice that the other vehicle 50 has entered the blind spot 5. In a case in which the rider has noticed the approach of the other vehicle 50 when the other vehicle 50 is approaching in the blind spot 5, the motorcycle 1 immediately executes turning control with the maximum torque. In contrast, in a case in which the rider fails to notice the approach of the other vehicle 50, the motorcycle 1 decreases the initial intervention amount of turning control and gradually increases the piloting torque. That is, this graph illustrates a transition in the piloting torque in a case in which the rider fails to notice the approach of the other vehicle 50 in the blind spot 5 (the rider fails to perform the avoidance operation).

At a time $t_1$, in a case in which the blind spot recognizer 8 has detected the approach of the other vehicle 50 from the direction of the blind spot 5 and the rider fails to notice the approach of the other vehicle 50, the piloting torque gradually increases to a target maximum torque $Q_1$ at a time $t_2$. Accordingly, turning control for avoiding the other vehicle 50 can be executed without giving the rider a sense of unease. The piloting torque is maintained at the target maximum torque $Q_1$ from the time $t_2$ to a time $t_3$, and then is gradually decreased to a time $t_4$. In addition, in a case in which the rider starts the avoidance operation while the piloting torque is gradually being increased, it is determined that the rider has noticed the approach of the other vehicle 50, and the piloting torque can be immediately increased to the target maximum torque $Q_1$.

As described above, according to the turn control device of the motorcycle according to the present disclosure, the turn device controller 10 performs turning control that avoids the other vehicle 50 in accordance with the riding state of the host vehicle 1. Therefore, the other vehicle 50 that approaches the host vehicle 1 from the direction of the blind spot 5 can be appropriately avoided. Also, the riding state of the host vehicle 1 includes the at least one of the course changing operation, the acceleration operation, or the deceleration operation of the rider, and the turn device controller 10 changes the intervention amount of turning control in accordance with the rider performing the at least one of the course changing operation, the acceleration operation, or the deceleration operation. Therefore, in a case in which the rider has not performed the at least one of the course changing operation, the acceleration operation, or the deceleration operation even when the other vehicle 50 has approached the host vehicle 1 and thus it can be determined that the rider has failed to notice the approach of the other vehicle 50, it is possible to adjust changes in a vehicle body behavior by changing the intervention amount of turning control. Further, the turn device controller 10 gradually increases the intervention amount of turning control in accordance with the rider performing the at least one of the course changing operation, the acceleration operation, or the deceleration operation. Therefore, in a case in which it can be determined that the rider has failed to notice the approach of the other vehicle 50, it is possible to prevent sudden changes in the vehicle body behavior and prevent giving the rider a sense of unease by gradually increasing the intervention amount of turning control.

In addition, an embodiment of the motorcycle, a mode of the imager, configurations of the controller and the turn device, a manner in which the piloting torque initially increases when the rider fails to notice the approach of the other vehicle, and the like are not limited to the above embodiment, and various modifications are possible. The turn control device according to the present disclosure is not limited to a motorcycle, but can be applied to a saddled, three-wheeled vehicle or the like.

EXPLANATION OF REFERENCE NUMERALS 1 host vehicle (motorcycle), 2 imager, 5 blind spot of host vehicle, 8 blind spot recognizer, 10 turn device controller, 50 other vehicle

The invention claimed is:

1. A turn control device for a motorcycle, comprising:
an imager that is configured to take an image in an outer direction of a host vehicle;
a blind spot recognizer that is configured to recognize, based on information from the imager, an approach of another vehicle from a direction of a blind spot of the host vehicle; and
a turn device controller that is configured to perform turning control based on information from the blind spot recognizer,
wherein the turn device controller performs turning control to avoid the other vehicle in accordance with a riding state of the host vehicle,
the riding state of the host vehicle includes at least one of a course changing operation, an acceleration operation, or a deceleration operation performed by a rider,
the turn device controller is configured to change an intervention amount of turning control in accordance with the rider performing the at least one of the course changing operation, the acceleration operation, or the deceleration operation, and
the turn device controller is configured, in a case in which the rider has failed to perform the at least one of the course changing operation, the acceleration operation, or the deceleration operation, to gradually increase the intervention amount of turning control and, in a case in which the rider performs the at least one of the course changing operation, the acceleration operation, or the deceleration operation, immediately increase the intervention amount of steering control.

2. The turn control device for the motorcycle according to claim 1, wherein the turn control device is configured, in a case in which the rider performs the at least one of the course changing operation, the acceleration operation, or the deceleration operation, to immediately execute turning control with a maximum torque.

* * * * *